US005278352A

United States Patent [19]

Schade

[11] Patent Number: 5,278,352

[45] Date of Patent: Jan. 11, 1994

[54] GROUNDING RING FOR GROUND ADAPTERS

[75] Inventor: Nicholas F. Schade, Oakdale, Conn.

[73] Assignee: The United States of America as represented by the Secretary of the Navy, Washington, D.C.

[21] Appl. No.: 725,719

[22] Filed: Jul. 3, 1991

[51] Int. Cl.[5] .............. H02G 3/06

[52] U.S. Cl. .............. 174/65 S S; 174/35 G C; 267/158; 267/163; 267/181

[58] Field of Search .............. 174/35; 267/158, 163, 267/181

[56] References Cited

U.S. PATENT DOCUMENTS

| | | | |
|---|---|---|---|
| 2,604,507 | 7/1952 | Tyson | 174/35 G C |
| 3,830,957 | 8/1974 | Oberdiear | 174/78 |
| 3,904,810 | 9/1975 | Kraus | 174/35 G C |
| 4,022,966 | 5/1977 | Gajajiva | 174/65 S S |
| 4,570,031 | 2/1986 | Inoue | 174/72 B |
| 4,885,429 | 12/1989 | Schnittker | 174/65 S S |
| 5,001,297 | 3/1991 | Peregrim et al. | 174/35 G C |

*Primary Examiner*—Leo P. Picard
*Assistant Examiner*—David A. Tone
*Attorney, Agent, or Firm*—Michael J. McGowan; Prithvi C. Lall; Michael F. Oglo

[57] ABSTRACT

The present invention relates to a grounding ring which may be used in ground adapters. The grounding ring has a structure resembling a miniature box girder with an irregular hexagonal cross section and is bent into a toroidal configuration. The grounding ring is characterized by increased wall areas for establishing electrical contact between a surface of a conductor and a surface of a stuffing tube, grounding conduit, or shield grounding fitting. The grounding ring provides improved EM performance and better capacitive coupling.

16 Claims, 1 Drawing Sheet

GROUNDING RING FOR GROUND ADAPTERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of Invention

The present invention relates to an improved grounding ring for use in grounding adapter devices. The improved grounding ring of the present invention has a vastly larger contact area which provides better capacitive coupling.

(2) Statment of Prior Art

Electrical connectors frequently employ spring devices to provide electrical contact between a cable and a surrounding housing. U.K. Patent No. 1,402,861 to Sutcliff illustrates one such electrical connector. The connector includes a sleeve or housing formed of electrically conductive material anchored to a wall of a box structure and a bush member adapted to co-operate with the housing. The bush member has a central aperture through which a cable such as a coaxial cable is passed. A helically wound spring bent to form a ring is positioned within the sleeve to provide electrical contact between the housing and a portion of the cable. To obtain maximum contact between the spring, the cable and the housing, the spring is compressed by the bush member.

Today, virtually all grounding devices relating to wire, cable, or conduit groundings that are used in relation with stuffing tubes, shield grounding adapters, or conduit grounding fittings, use either soldered, compression, or spring type devices to cause internal grounding. U.S. Pat. No. 3,830,957 to Oberdiear illustrates one such grounding device for a shielded electrical cable. The grounding device includes a pair of relatively soft resilient O-rings, each of which is surrounded by a braided metal sheath, disposed between a cable and a housing. The rings are mounted adjacent oppositely facing bevel rings with a straight sided washer disposed between them. A nut threadedly connected to the housing is tightened to diametrically compress and distort the O-rings and sheaths simultaneously. The sheaths are thus distorted into electrical grounding engagement with the shield of the cable, the bevel rings, washer and an inner housing wall. A similar type of device is illustrated in German Offenlegungsschrift 24 05 241 to Siemens AG. One of the deficiencies of these devices is that the O-rings tend to be permanently compressed thus lessening their ability to provide good electrical contact.

In other types of devices, a toroidally shaped grounding ring such an iris ring is used to provide electrical contact between the electrical cable to be grounded and the grounding adapter or stuffing tube. Swedish Patent No. 131,239 to Sjoholm illustrates such a device. The principal deficiency of these types of grounding rings is the relatively small tangential contact areas which can be subjected to corrosion, contamination, and varying electrical performance depending on the pressures applied to the ring.

SUMMARY OF THE INVENTION

Accordingly, it is an object of the present invention to provide a grounding ring for use in a ground adapter having a vastly increased contact area.

It is a further object of the present invention to provide a grounding ring as above which exhibits better capacitive coupling and is compatible with most present grounding adapter designs.

These and further objects and advantages will become more clearer from the following description and drawings in which like reference numerals depict like elements.

The foregoing objects and advantages are attained by the grounding ring element made of strip stock of conductive metal of the present invention which comprises in a blank form (i.e., before being rolled, or convolutedly bent, in its width and length dimensions) a solid conductive central portion with a plurality of conductive fingers extending from opposed sides of the central portion. The grounding ring element in its width dimension is rolled, or convolutedly bent, into a structure resembling a miniature box girder having an irregular hexagonal cross section in which the fingers on one side of the central portion overlap the fingers on the other side of the central portion. As mentioned, the grounding ring element is formed from an electrically conductive material. If desired, the grounding ring element may be tin plated to improve conductivity characteristics and resistance to corrosion.

In use, the grounding ring element is rolled, or convolutedly bent, for positioning in an annular cavity within a stuffing tube between an inclined internal surface of the tube and a centrally aligned conductor. A nut is provided for compressing the grounding ring element against the inclined surface and the conductor so as to increase the ring contact area. The grounding ring element of the present invention is advantageous in this respect in that it is designed to mate closely with the surface of the conductor and the stuffing tube surface so as to provide better electrical contact for improved performance.

Other details of the grounding ring of the present invention are set out in the following description.

DESCRIPTION OF THE PREFERRED EMBODIMENT

Figure 2:
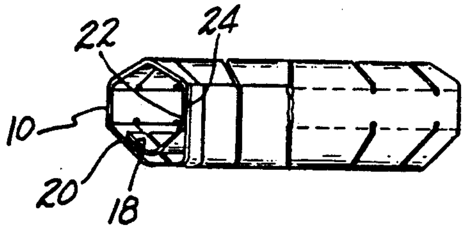
FIG. 2 illustrates the grounding ring element of the present invention in a rolled or convolutedly bent condition in the width and 1 dimension of the blank strip form of FIG. 1.
Figure 1:
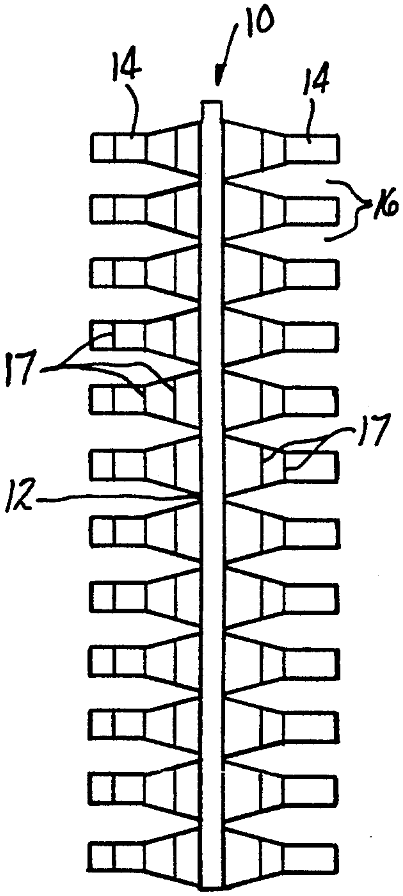
FIG. 1 is an illustration of the blank strip form, i.e., before the strip is rolled or convolutedly bent in its width and length dimensions, of the grounding ring element of the present invention.

Referring now to the drawings, FIG. 1 illustrates a grounding ring element 10 in accordance with the present invention, which is made of metallic strip material, and which in this figure is shown in its blank condition before being rolled, or convolutedly bent, in its width and length dimensions. The grounding ring element 10 has a continuous central portion 12 and a plurality of fingers 14 extending from both sides of the central portion. The fingers 14 are shaped so as to provide spaces 16 between adjacent fingers. The spaces 16 are needed to allow the ring blank to be formed into a structure resembling a miniature box girder having an irregular hexagonal cross section as shown in FIG. 2. Further, the spaces 16 are needed to allow the box girder resembling structure in turn to be formed into a hollow toroidal configuration for positioning in an annular cavity within a ground adapter assembly as shown in FIGS. 3 and 4.

The central portion 12 and the fingers 14 are made of an electrically conductive material such as copper, a copper alloy, aluminum, or an aluminum alloy. If desired, the central portion 12 and/or the fingers 14 may be plated with a material such as tin to improve electrical conductivity and resistance to corrosion. The material used for the central portion 12 and the fingers 14 should have suitable spring tension and stiffness so as to compress evenly while not suffering any deformation, even after many cycles.

As discussed above, FIG. 2 illustrates the grounding ring element 10 in its formed condition. The strip material in its blank condition may be formed into the final toroidal form of grounding ring element 10 using any suitable forming technique known in the art. For example, the blank may pass through one or more stations (not shown) where the fingers 14 are bent along the crease lines 17 while the longitudinal dimension of the planar strip is being formed into a hollow toroid of the box girder resembling structure.

Figure 3:
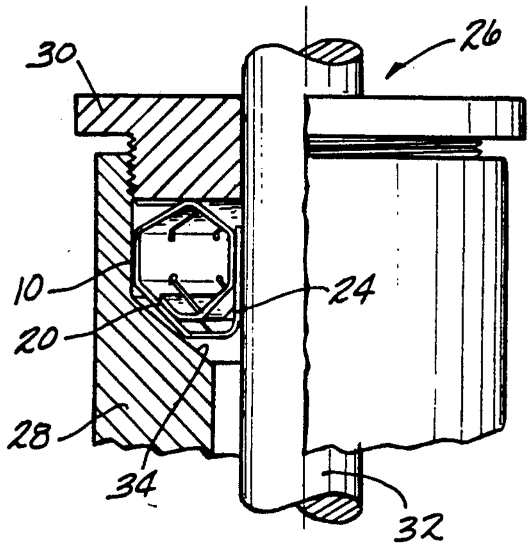
FIGS. 3 and 4 illustrate in partial cross section the grounding ring element of the present invention positioned within an annular cavity of a ground adapter.
Figure 4:
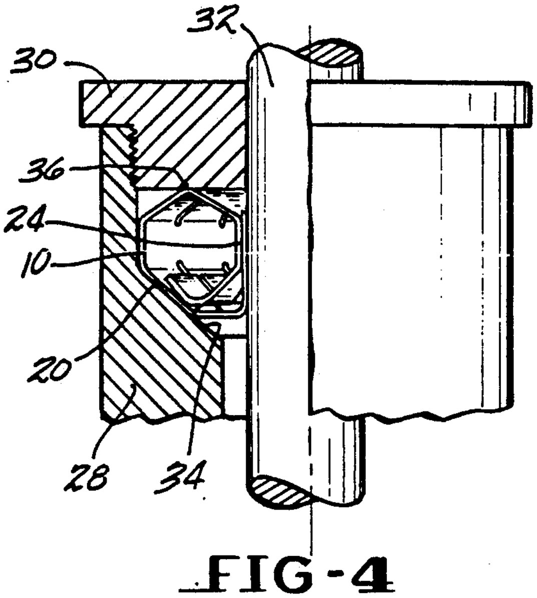

As shown in FIG. 2 viewed in conjunction with FIGS. 3 and 4, the grounding ring element 10 in its final form has an irregular hexagonal cross section with overlapping walls 18, 20, 22 and 24 defined by fingers in each pair being overlapped. Note that walls 18 and 20 are generally parallel to inclined surface 34, and that walls 22 and 24 are parallel to the surface of conductor 32. It has been found that this shape is significant in that it enables the amount of surface contact in particular areas to be increased.

FIG. 3 illustrates the grounding ring element 10 installed within a grounding adapter 26. The grounding adapter 26 is formed by a stuffing tube 28 made of an electrically conductive material and a nut 30 threadedly engaging the stuffing tube. The nut 30 may be made from either an electrically conductive or a non-conductive material. An electrical conductor or wire 32 is centrally positioned within the stuffing tube 28. The conductor 32 passes through a central opening or passageway in the nut 30 and an aligned opening in the stuffing tube 28.

The grounding ring element 10 is positioned within the stuffing tube such that the elongated wall 24 is in contact with the outer surface of the conductor 32 and the elongated wall 20 is in contact with an internal inclined surface 34 of the stuffing tube.

As shown in FIG. 3, the nut 30 is only partially threaded into the stuffing tube 28. In this pre-compressed condition, only partial contact is had between the wall 24 and the conductor surface and the wall 20 and the surface 34. When the nut is fully seated against the grounding ring at the apex point 36 of the hexagonal toroidal cross section, as shown in FIG. 4, there is maximum contact between the wall 24 and the conductor surface and between the wall 20 and the surface 34. The spring tension of the material forming the grounding ring assists in improving and continuing the electrical contact between the stuffing tube 28 and the conductor or wire 32.

The device of the present invention will have improved electromagnetive (EM) performance, (i.e., performance in shunting electromagnetic signals induced into the conductor's shield layer to a ground plane) even when not fully tightened, and a reduced chance of any cable or conduit deformation when the nut is fully torqued down. The vastly increased electrical contact area with the grounding ring element of the present invention will be most appreciated when used on the irregular surface of some conduit pipes or shielding braid. This improved contact area should provide better capacitive coupling as well as result in a lower contact transfer impedance.

The grounding ring element 10 of the present invention is advantageous in that it is compatible with most present grounding adapter designs, thus providing an economical "drop-in" fix to many grounding problems. Additionally, it may be used statically in stuffing tubes, conduit grounding adapters and shield ground fittings. It could also be used as a dynamic grounding aid in cases where minimal RPM is called for.

The grounding ring element 10 of the present invention has particular utility on board ships and ocean platforms where extreme adverse environmental conditions are encountered.

It is apparent that there has been provided in accordance with this invention a grounding ring element 10 for ground adapters which fully satisfies the objects, means, and advantages set forth hereinbefore. While the invention has been described in combination with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A grounding system comprising:

a conductor;

a surrounding tubular structure having an inclined surface;

said conductor passing through said tubular structure; and a grounding device for grounding said conductor to said surrounding tubular structure having said inclined surface, said grounding device comprising a grounding ring having a structure resembling a miniature box girder with a polygonal and hollow cross section, said grounding ring having a first wall contacting said inclined internal surface and a second wall contacting a surface of said conductor.

2. The grounding system of claim 1 further comprising:

said grounding ring further having a hollow toroidal configuration.

3. The grounding system of claim 1 wherein said grounding ring is made of a strip of sheet metal which in its width dimension is convolutedly creased and bent to form said structure resembling a miniature box girder and in its length dimension is convolutedly bent to cause the miniature box girder structure to form a toroid, said strip of sheet metal having a continuous central portion and a plurality of finger pairs extending from two opposed sides of said central portion with the construction and arrangement of the fingers such as to allow said central portion along the length dimension of the strip of sheet metal to convolutedly bend thereby enabling the miniature box girder structure to form a toroid as aforesaid.

4. The grounding system of claim 3 wherein said strip of sheet metal comprises an electrically conductive material plated with tin to help improve conductivity and corrosion resistance.

5. The grounding system of claim 3 wherein the creasing and bending of the metal strip in its width dimension causing a degree of convolution which in turn causes an overlapped condition of the fingers in each pair when said grounding ring is in said convoluted creased and bent form.

6. The grounding system of claim 1 wherein said tubular structure comprises a stuffing tube and said conductor passes through the center of said stuffing tube.

7. The grounding system of claim 1 further comprising:

said grounding ring having a third wall generally parallel to said first wall and said inclined surface and a fourth wall generally parallel to said second wall and said conductor surface; and said first and third walls being in contact with each other and said second and fourth walls being in contact with each other.

8. The grounding system of claim 1 wherein said tubular structure comprises a shield grounding adapter.

9. The grounding system of claim 1 wherein said tubular structure comprises a conduit grounding fitting.

10. A grounding system comprising:

a conductor;

a surrounding tubular structure having an inclined surface;

said conductor passing through said tubular structure;

a grounding device for grounding said conductor to said surrounding tubular structure having said inclined surface, said grounding device comprising a grounding ring having a structure resembling a miniature box girder with a polygonal cross section, said grounding ring having a first wall contacting said inclined internal surface and a second wall contacting a surface of said conductor; and the cross section of the box girder having the shape of an irregular hexagon.

11. A grounding system comprising:

a conductor;

a surrounding tubular structure having an inclined surface;

said conductor passing through said tubular structure;

a grounding device for grounding said conductor to said surrounding tubular structure having said inclined surface, said grounding device comprising a grounding ring having a structure resembling a miniature box girder with a polygonal cross section, said grounding ring having a first wall contacting said inclined internal surface and a second wall contacting a surface of said conductor;

nut means seated against a portion of said grounding ring; and said nut means having a threaded portion engaging an internal threaded portion of said tubular structure, whereby tightening of said nut means compresses said grounding ring against said inclined surface and said conductor surface so as to increase the ring contact area.

12. The grounding system of claim 11 wherein said nut means has a central passageway through which said conductor passes.

13. A grounding ring for ground adapters comprising a miniature box girder in toroidal form, said miniature box girder being formed from a blank having a width dimension, a longitudinal dimension, a longitudinally extending solid conductive central portion and a plurality of conductive fingers extending from opposed sides of said central portion, said width dimension of said blank being in a convolutedly bent condition with said fingers on one side of said central portion overlapping said fingers on the other side of said central portion and said longitudinal dimension of the blank being convolutedly bent to form said grounding ring.

14. The grounding ring of claim 13 wherein said central portion and said fingers are formed from an electrically conductive material.

15. The grounding ring of claim 14 wherein said central portion and said fingers are plated with tin to improve conductivity and corrosion resistance.

16. The grounding ring of claim 13 wherein said ring in said convolutedly bent condition has an irregular hexagonal cross section.

* * * * *